(12) United States Patent
Chen (10) Patent No.: US 11,973,447 B2
(45) Date of Patent: Apr. 30, 2024

(54) SELECTIVE PHASE CONTROL OF AN ELECTRIC MACHINE

(71) Applicant: Tula eTechnology, Inc., San Jose, CA (US)

(72) Inventor: Zhiqian Chen, Palo Alto, CA (US)

(73) Assignee: Tula eTechnology, Inc., San Jose, CA (US)

( * ) Notice: Subject to any disclaimer, the term of this patent is extended or adjusted under 35 U.S.C. 154(b) by 186 days.

(21) Appl. No.: 17/840,116

(22) Filed: Jun. 14, 2022

(65) Prior Publication Data

US 2022/0416707 A1    Dec. 29, 2022

Related U.S. Application Data

(60) Provisional application No. 63/215,859, filed on Jun. 28, 2021.

(51) Int. Cl.
| | |
|---|---|
| *H02P 25/08* | (2016.01) |
| *H02K 1/278* | (2022.01) |
| *H02K 3/12* | (2006.01) |
| *H02K 3/28* | (2006.01) |

(52) U.S. Cl.
CPC ............ *H02P 25/08* (2013.01); *H02K 1/278* (2013.01); *H02K 3/12* (2013.01); *H02K 3/28* (2013.01); *H02K 2213/03* (2013.01)

(58) Field of Classification Search
CPC .... H02P 1/163; H02P 1/18; H02P 1/24; H02P 1/42; H02P 1/423; H02P 1/46; H02P 3/00; H02P 6/08; H02P 6/06; H02P 6/14; H02P 6/28; H02P 25/08; H02P 25/092; H02P 25/089; H02P 25/0925; H02P 27/06; H02P 27/08; H02P 6/17; H02P 23/0027; H02P 23/009; H02P 21/0089; H02P 2205/07; H02P 6/20; H02P 25/022; H02P 25/22; H02K 1/24; H02K 7/006; H02K 1/246; H02K 1/2706; H02K 41/03; B60L 2240/421; B60L 2240/423; B60L 2210/40; B60L 2240/429; B60L 2240/443; B60L 15/08; B60L 2220/18
See application file for complete search history.

(56) References Cited

U.S. PATENT DOCUMENTS

| | | | |
|---|---|---|---|
| 4,441,043 | A | 4/1984 | Decesare |
| 4,989,146 | A | 1/1991 | Imajo |
| 5,099,410 | A | 3/1992 | Divan |
| 5,151,637 | A | 9/1992 | Takada et al. |

(Continued)

FOREIGN PATENT DOCUMENTS

| | | |
|---|---|---|
| CN | 1829070 A | 9/2006 |
| CN | 102381265 A | 3/2012 |

(Continued)

OTHER PUBLICATIONS

Ichihara Rei et al., Swithed Reluctance Motor Control Device and Switched Reluctance Motor Control Method, Sep. 24, 2020, Clarivate Analytics, pp. 1-8 (Year: 2020).*

(Continued)

*Primary Examiner* — Antony M Paul
(74) *Attorney, Agent, or Firm* — Beyer Law Group LLP (57) ABSTRACT

Methods, controllers and electric machine systems are described for selective phase control of electric machines (e.g. electric motors and generators).

20 Claims, 8 Drawing Sheets

(56) References Cited

U.S. PATENT DOCUMENTS

| | | |
|---|---|---|
| 5,325,028 A | 6/1994 | Davis |
| 5,483,141 A | 1/1996 | Uesugi |
| 5,640,073 A | 6/1997 | Ikeda et al. |
| 5,701,062 A | 12/1997 | Barrett |
| 5,731,669 A | 3/1998 | Shimizu et al. |
| 6,121,740 A | 9/2000 | Gale et al. |
| 6,291,960 B1 | 9/2001 | Crombez |
| 6,308,123 B1 | 10/2001 | Ikegaya et al. |
| 6,370,049 B1 | 4/2002 | Heikkila |
| 6,424,799 B1 | 7/2002 | Gilmore |
| 6,483,218 B1 | 11/2002 | Petrinko |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,084,970 B2 | 12/2011 | Mullin et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 8,841,876 B2 | 9/2014 | Leaver et al. |
| 9,006,941 B2 | 4/2015 | Zhao |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,345,241 B1 | 5/2022 | Cai |
| 11,427,177 B2 | 8/2022 | Serrano et al. |
| 11,557,996 B1 | 1/2023 | Arvanitis |
| 11,623,529 B2 | 4/2023 | Carvell et al. |
| 11,626,827 B2 | 4/2023 | Tripathi |
| 11,628,730 B2 | 4/2023 | Srinivasan |
| 11,637,513 B2 | 4/2023 | Phillips et al. |
| 11,673,476 B2 | 6/2023 | Cai |
| 11,695,361 B2 | 7/2023 | Carvell et al. |
| 11,863,096 B2 | 1/2024 | Carvell |
| 2001/0039926 A1 | 11/2001 | Kobayashi et al. |
| 2002/0043954 A1 | 4/2002 | Hallidy et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0058592 A1 | 3/2009 | Leghissa et al. |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0066299 A1 | 3/2010 | Izumi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0002173 A1 | 1/2013 | Baglino et al. |
| 2013/0062138 A1 | 3/2013 | Naitou et al. |
| 2013/0119814 A1 | 5/2013 | Burch et al. |
| 2013/0134912 A1 | 5/2013 | Khalil et al. |
| 2013/0141027 A1 | 6/2013 | Nakata |
| 2013/0221889 A1 | 8/2013 | Kim et al. |
| 2013/0226420 A1 | 8/2013 | Pedlar et al. |
| 2013/0241445 A1 | 9/2013 | Tang |
| 2013/0258734 A1 | 10/2013 | Nakano et al. |
| 2013/0314021 A1 | 11/2013 | Yamada et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0236628 A1 | 8/2015 | Wang et al. |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0006592 A1 | 1/2018 | Faid et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0267919 A1 | 8/2019 | Suzuki et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |

(56) References Cited

U.S. PATENT DOCUMENTS

| | | |
|---|---|---|
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |
| 2021/0351733 A1 | 11/2021 | Carvell |
| 2023/0114289 A1 | 4/2023 | Islam et al. |
| 2023/0219426 A1 | 7/2023 | Carvell et al. |
| 2023/0223885 A1 | 7/2023 | Tripathi |
| 2023/0253911 A1 | 8/2023 | Islam |
| 2023/0308040 A1 | 9/2023 | Farah et al. |
| 2024/0022191 A1 | 1/2024 | Phillips et al. |
| 2024/0022199 A1 | 1/2024 | Phillips et al. |
| 2024/0022200 A1 | 1/2024 | Phillips et al. |

FOREIGN PATENT DOCUMENTS

| | | | |
|---|---|---|---|
| CN | 104716754 A | 6/2015 | |
| CN | 204589885 U | 8/2015 | |
| CN | 105196877 A | 12/2015 | |
| CN | 205229379 U | 5/2016 | |
| CN | 106932208 A | 7/2017 | |
| CN | 107067780 A | 8/2017 | |
| CN | 207129052 U | 3/2018 | |
| CN | 108216026 A | 6/2018 | |
| CN | 108445386 A | 8/2018 | |
| CN | 110212725 | 9/2019 | |
| DE | 102014206342 | 10/2015 | |
| EP | 2605398 A1 | 6/2013 | |
| FR | 2989479 | 10/2013 | |
| GB | 2273212 | 8/1994 | |
| JP | H05153705 | 6/1993 | |
| JP | 10243680 | 9/1998 | |
| JP | 2008-079686 A | 4/2008 | |
| JP | 2009-065758 A | 3/2009 | |
| JP | 2010119216 | 5/2010 | |
| JP | 2011-67043 | 3/2011 | |
| JP | 5165660 B2 | 12/2012 | |
| JP | 2014-033449 A | 2/2014 | |
| JP | 5857472 B2 | 12/2015 | |
| JP | 2017-011970 A | 1/2017 | |
| JP | 2017-200382 | 11/2017 | |
| JP | 2018-033250 A | 3/2018 | |
| JP | 2020048254 A | 3/2020 | |
| JP | 2020156166 A | * 9/2020 | ............ H02P 25/08 |
| JP | 2022/020123 | 2/2022 | |
| KR | 10-2011-0059742 | 6/2011 | |
| KR | 10-2013-0095773 | 8/2013 | |
| KR | 10-2017-0021146 A | 2/2017 | |
| KR | 10-2017-0032976 A | 3/2017 | |
| KR | 10-2020-0129227 | 11/2020 | |
| WO | WO03/36787 A1 | 5/2003 | |
| WO | WO2012-010993 A2 | 1/2012 | |

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.

Spong et al., "Feedback Linearizing Control of Switched Reluctance Motors", IEEE Transactions on Automatic Control, vol. AC-32, No. 5, May 1987, pp. 371-379.

Mirzaeva et al., "The use of Feedback Quantizer PWM for Shaping Inverter Noise Spectrum", Power Electronics and Motion Control Conference (EPE/PEMC), 2012 15$^{th}$ International IEEE, Sep. 4, 2012, pp. DS3c. 10-1, XP032311951, DOI: 10.1109/EPEPEMC.2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Srinivasan, U.S. Appl. No. 17/158,230, filed Jan. 26, 2021.

International Search Report from International Application No. PCT/US2022/033413 dated Oct. 7, 2022.

Carvell et al., U.S. Appl. No. 18/362,602, filed Jul. 31, 2023.

Parsels et al., U.S. Appl. No. 18/452,363, filed Aug. 18, 2023.

Islam et al., U.S. Appl. No. 18/452,050, filed Aug. 18, 2023.

Islam et al., U.S. Appl. No. 18/452,260, filed Aug. 18, 2023.

* cited by examiner

SELECTIVE PHASE CONTROL OF AN ELECTRIC MACHINE

CROSS-REFERENCE TO RELATED APPLICATION

This application claims the benefit of priority of U.S. Application No. 63/215,859, filed Jun. 28, 2021, which is incorporated herein by reference for all purposes.

BACKGROUND

The present application relates generally to the control of electric machines. More specifically, control schemes and controller designs are described that selectively operate phases of a multi-phase electric machine during specified operating conditions to facilitate operating the electric machine in a more-energy efficient manner.

Electric motors and generators are structurally very similar. Both include a stator having a number of poles and a rotor. Most electrical motors can operate as a generator and vice-versa. When operating as a motor, electrical energy is converted into mechanical energy. When operating as a generator, mechanical energy is converted into electrical energy. The term "machine" as used herein is therefore intended to be broadly construed to mean both electric motors and generators.

Electric motors and generators are used in a very wide variety of applications and under a wide variety of operating conditions. In general, many modern electric machines have relatively high energy conversion efficiencies. The energy conversion efficiency of most electric machines, however, can vary considerably based on their operational load. With many applications, an electric machine is required to operate under a wide variety of different operating load conditions. As a result, many electric machines operate at or near the highest levels of efficiency at certain times, while at other times, they operate at lower efficiency levels. The machine is generally most efficient when it is operating within a particular speed range and generating torque within a defined range.

For conventional switch reluctance motors (SRM's) current command is decided from the demanded torque, and a controller modulates the voltage pulse width to regulate the current so that the motor outputs an almost constant torque to match the demand, or non-constant to minimize noise. However, the motor does not always operate at its best efficiency in this method.

Accordingly, a need therefore exists to operate electric machines, such as motors and generators, at higher levels of efficiency.

SUMMARY

A variety of methods, controllers and electric machine systems are described for selective phase control of electric machines (e.g. electric motors and generators).

In one non-exclusive embodiment, a method of operating an electric machine includes controlling the current in the stator coils to skip phases or phase portions of current delivered to the machine according to an input demand.

In another non-exclusive embodiment, an electric machine is provided. A stator has a multiplicity of spaced-apart individual stator windings. A rotor is in proximity to the stator. The rotor is rotationally responsive to current delivered to the individual stator windings. A controller being electrically coupled to the stator independently provides delivery of current to the individual stator windings, where the controller configured to deliver current to the individual stator windings in a plurality of sequential phases to drive motion of the rotor and selectively skip one or more of the plurality of sequential phases or a portion of one or more of the plurality of sequential phases in response to an input demand to the electric machine.

BRIEF DESCRIPTION OF THE DRAWINGS

The technology described herein and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present application relates generally to selective phase control that may be implemented in a wide variety of electric machines (e.g. electric motors and generators).

For the sake of brevity, the selective phase control of electric machines as provided herein are described in the particular context of a switched-reluctance motor (SRM). This exemplary configuration, however, should not be construed as limiting in any regard. On the contrary, the selective phase control as described herein can be used for many types of electric machines, meaning both electric motors and generators. For instance, the machine as described herein may be used with any type of machine regardless if AC (e.g. induction, synchronous, etc.) or DC (e.g. brushless, electrically excited, permanent magnet, series wound, shunt brushed, compound, etc.). In addition, selective phase control of such electric machines may be used in a number of applications. In particular, the same or similar selective phase control strategies, as described herein, may be used in systems that vary significantly with respect to acceleration and deceleration rates for applications ranging from electric motors for heating, cooling, and ventilating systems to vehicles and appliances like compressors, washing machines, dryers, and dishwashers.

The switched reluctance motor (SRM) is an electric motor that runs by reluctance torque generated through two primary components: a stationary stator and a rotating rotor. Unlike common brushed DC motor types, power is delivered to windings in the stator rather than the rotor. This greatly simplifies mechanical design as power does not have to be delivered to a moving part but can complicate the electrical design as some sort of switching system is generally employed to deliver power to the different windings. The rotor has no permanent magnet or windings, only steel laminations. In a typical SRM both the rotor and stator have salient poles, with the number of the rotor poles differing from the number of stator poles, with at least two poles being coupled connected in series or parallel to form one phase of the motor. Typical combinations of the stator/rotor poles are 4/2 (2-phase), 6/4 (3-phase), 8/6 (4-phase), 10/8 (5-phase), 12/8 (3-phase), etc. Motion of the rotor is driven by energizing/de-energizing the phase windings in a timed sequence to generate a rotating magnetic field (RMF) to induce rotation of the rotor.

Electric Machine with Selective Phase Control

Figure 1:
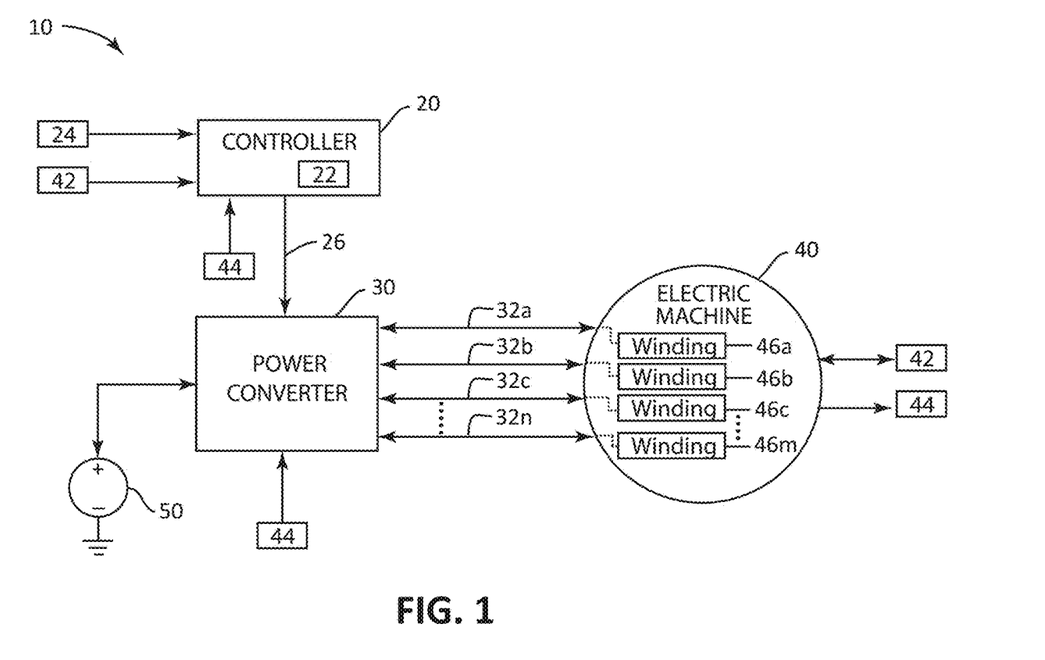
FIG. 1 is a functional block diagram illustrating a selective phase electric machine control system in accordance with a non-exclusive embodiment of the present description.

FIG. 1 illustrates a selective phase control system 10 in accordance with a non-exclusive embodiment of the present technology. In this embodiment, the system 10 includes a machine controller 20, a power supply/sink 50, a power converter 30, and an electric machine 40.

When the electric machine 40 is operated as a motor, the machine controller 20 functions as a motor controller, and the power converter 30 is responsible for converting power received from power supply 50 to a form that is suitable for driving the electric machine 40 in accordance with signal 26 from the controller 20. The selective phase input power, labeled as dedicated line 32a, line 32b, and dedicated line 32c . . . line 32n (where n=the number of phases of the electric machine 40), is applied to respective stator windings 46a, 46b, 46c . . . 46m, where m=the number of stator windings of the electric machine 40, for generating the rotational motion used to drive the electric machine 40. Each dedicated line 32a, 32b, 32c, up to 32n provides independent control of each winding or multiplicity of stator windings 46a, 46b, 46c, 46m such that timing and switching of the phases may be controlled. It is appreciated that the phases and associated dedicated lines 32a, 32b, 32c, up to 32n may be independently wired to a single winding at a stator pole (or stator tooth location), pair of windings at opposing stator poles (e.g. as provided in the exemplary configuration of FIG. 2), or other number of winding/pole configurations (e.g. a 3 phase 12/8 motor would have three dedicated lines each wired to windings dispersed over 4 stator poles). In a 2-phase motor, only two dedicated lines 32a, 32b would be coupled to respective stator windings 46a, 46b wound on opposing pairs of stator teeth or poles.

The dedicated lines depicting the various possible phases, e.g. 32a, 32b, 32c, 32n are shown with arrows on both ends indicating that current can flow both from the converter 30 to the electric machine 46 when the machine is used as a motor and that current can flow from the electric machine 46 to the converter 30 when the machine is used as a generator. When the electric machine 40 is operated as a generator, the machine controller 20 functions as a generator controller and the converter 30 converts power received from the generator to a form suitable for delivery to the power sink 50.

In embodiments in which the power supply/sink 50 can supply or receive power directly in the form required by or outputted by the electric machine 40, the converter 30 can conceptually take the form of a switch or logical multiplier that simply turns the motor on and off to facilitate operation of the electric machine 40.

The power supply/sink 50 can take any suitable form. In some implementations, the power supply/sink 50 may take the form of a battery or a capacitor. In other implementations, the power supply/sink 50 may be a power grid (e.g. "wall power"), a photovoltaic system, or any other available source. Similarly, the sink may be an electrical load (such as an electrically operated machine or appliance, a building, a factory, a home, etc.), a power grid or any other system that uses or stores electrical power.

The converter 30 can also take a wide variety of different forms. When the power supply/sink 50 is a DC power supply and the electric machine 40 is an AC motor, the converter 30 can take the form of an inverter. Conversely, when the power supply/sink 50 is a DC power sink and the electric machine 40 is an AC generator, the converter 30 can take the form of a rectifier. When both the power supply/sink 50 and the electric machine are AC components, the converter 30 may include a bidirectional or 4 quadrant power converter.

In FIG. 1, the requested output or demand 24, along with machine speed 44 may be input and/or provide feedback to the machine controller 20. Demand 24 may be in the form of a torque demand, speed demand, or both. The torque delivered 42 (which may also be referred to as output torque) or received by the electric machine 40 may also be measured and provide feedback for the system 10. In some embodiments, the machine controller 20 includes an application programming 22 that is stored in memory (not shown) and executable on a processor (not shown) to provide timing and/or other signal processing of one or more aspects of the current/signals to each of the stator windings 46a, 46b, 46c . . . 46m to operate the electric machine at optimal efficiency and other performance characteristics or parameters. In response to a currently requested input demand 24 as well as the input of machine speed 44 provided to the machine controller 20 and converter 30, the machine controller 20 as directed by instructions in application programming 22 may structure the timing and number of phases to the stator windings 46a, 46b, 46c . . . 46m and skip one or more phases, or phase portions, delivered to the electric machine 40 to meet the output of the requested input demand 24.

SRM Design

The switched reluctance motor (SRM) has been used in many commercial applications due to its unique mechanical structure and simple power electronic drive requirements. The intrinsic simplicity and ruggedness make it superior to other electric machines for a number of applications.

Figure 2:
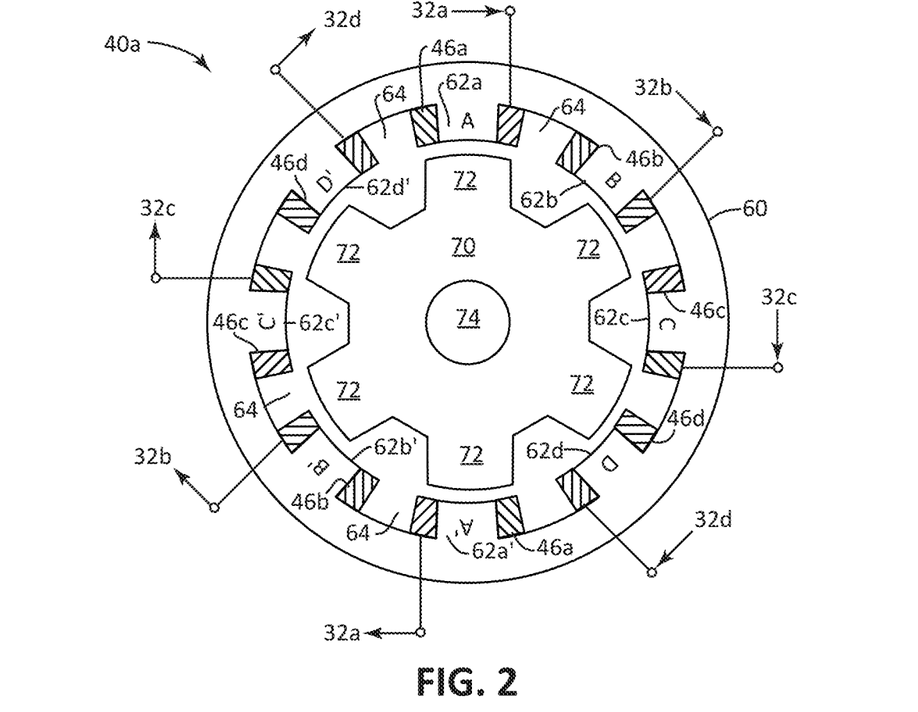
FIG. 2 illustrates an exemplary schematic side view of an electric machine in the form of a 4-phase SRM to be operated by the selective phase electric machine control system of FIG. 1.

FIG. 2 shows a schematic side view of an exemplary 4-phase 8/6 SRM 40a that may be operated as electric machine 40 in the selective phase electric machine control system 10 of FIG. 1. For the sake of clarity, FIG. 2 provides a simplified diagram of a stator 60 positioned in proximity to a rotor 70, with other components/wiring being omitted for clarity. As shown in FIG. 2, stator 60 of SRM 40a includes 8 stator teeth 62 and adjacent stator slots 64 that are disposed along radially spaced-apart circumferential locations of the stator 60. In one embodiment, stator 60 is composed of a laminated stack of stator discs disposed insulated with respect to each other along the axis of the stator 60. In a further embodiment, the stator 60 laminations or discs are composed of steel or like material. Rotor 70 may be similarly composed of a laminated stack of steel rotor discs.

As further shown in FIG. 2, four individual stator windings 46a, 46b, 46c and 46d, each of which forming a pair of winding coils that are coiled around opposing pairs of stator teeth 62a to 62d' to form pole pairs (e.g. A, A'; B, B'; C, C' and D, D'). Each stator winding 46a, 46b, 46c and 46d is independently wired to respective dedicated lines 32a, 32b, 32c, 32d and coupled to controller 20 such that each winding 46a, 46b, 46c and 46d may be independently powered at its own phase (e.g. respective phases A, B, C and D) and operated in a manner to drive motion of the rotor, i.e., generate the rotating magnetic field (RMF) to induce rotation of the rotor 70 and rotor shaft 74. For example, stator winding 46a is coiled around opposing stator teeth 62a and 62a' (using adjacent stator slots 64) to form poles A and A' (the coupling of stator winding pairs 46a across rotor 70 not shown for clarity) and is coupled at opposing ends to line 32a. Similarly, stator winding 46b is coiled around opposing stator teeth 62b and 62b' to form poles B and B' and is coupled at opposing ends to line 32b, stator winding 46c is coiled around of opposing teeth 62c and 62c' poles C and C' and is coupled at opposing ends to line 32c, and stator winding 46d is coiled around opposing stator teeth 62d and 62d' to form poles D and D' and is coupled at opposing ends to line 32d. While each of the individual stator windings 46a, 46b, 46c and 46d, 46a, 46b, 46c and 46d are shown in the embodiment of FIG. 2 as being coiled around a pair of teeth, it is appreciated that the individual stator windings 46a, 46b, 46c and 46d, 46a, 46b, 46c and 46d may be wound in any number pairings (e.g. 3 or more), or even only to a dedicated stator tooth or pole.

Figure 3:
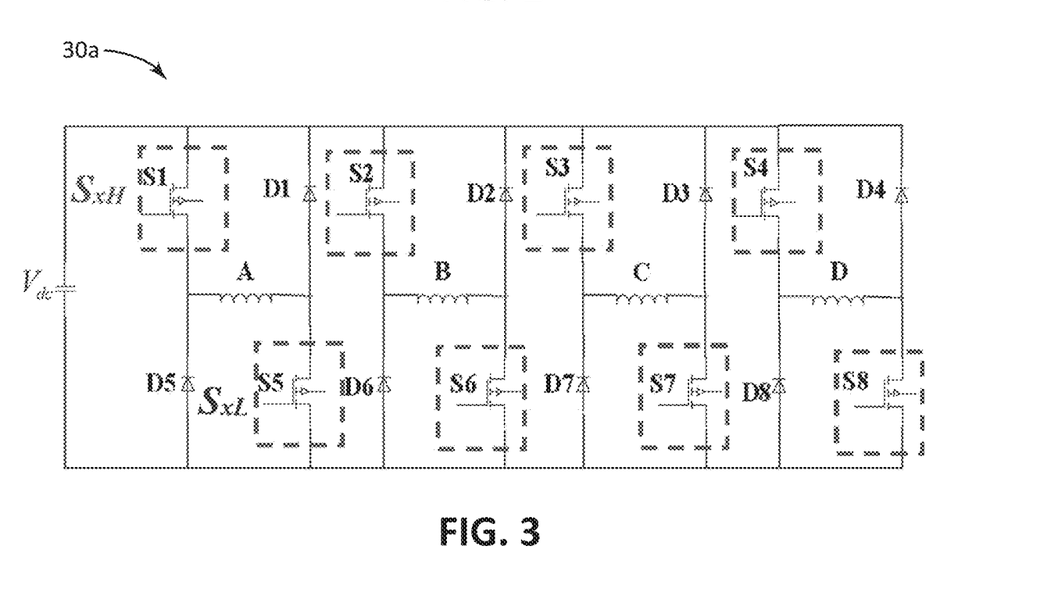
FIG. 3 shows a schematic circuit diagram of one embodiment of converter for use with the selective phase control system of FIG. 1, and in particular used in conjunction with the SRM of FIG. 2.

FIG. 3 shows a schematic circuit diagram of one embodiment of converter 30a that may be implemented as converter 30 of the selective phase control system 10 of FIG. 1, and in particular used in conjunction with the four-phase SRM 40a (e.g. as an inverter). The converter embodiment shown in FIG. 3 is configured as a four-phase, half-bridge, asymmetric power converter (APC), however it is appreciated that other types of converters/inverters may be used as is available in the art. The converter 30a comprises eight diodes (D1-D8) and eight switches (four high-side ($S_{xH}$) switches (S1, S2, S3, S4) and four low-side (SXL) switches (S5, S6, S7, S8)), with a pair of switches on both sides of each phase or winding (A, B C, D). For example, phase A (e.g. corresponding to line 32a and stator windings 46a on poles A, A' of rotor 70 in FIG. 2) is disposed between switches S1 and S5, phase B (e.g. corresponding to line 32b and stator windings 46b on poles B, B' of rotor 70 in FIG. 2) is disposed between switches S2 and S6, phase C (e.g. corresponding to dedicated line 32c and stator windings 46c on poles C, C' of rotor 70 in FIG. 2) is disposed between switches S3 and S7, and phase D (e.g. corresponding to line 32d and stator windings 46d on poles D, D' of rotor 70 in FIG. 2) is disposed between switches S4 and S8. In one embodiment, converter 30a configured to operate each phase in three states (modes): 1) excitation (charging) where both switches are on and the current flows in a first direction (e.g. from S1 to S5 across phase winding A); 2) freewheeling (idle) where one switch is on and one is off in a zero voltage loop (e.g. across S5, D5 and phase winding A); and 3) demagnetization (discharging) where both switches are off and current flows in the opposite direction (e.g. from D5 to D1 across phase winding A). In embodiments, switches S1 to S8 may comprise Insulated Gate Bipolar Transistors (IBGTs), Metal Oxide Silicon Field Effect Transistors (MOSFETs), or like devices.

Referring to FIG. 4A through FIG. 6C, controller 20 and application programming 22 are configured to control operation of electric machine 40, and in particular provide command signals to converter 30 and/or electric machine 40 involving one or more skipped phase or phase portions in response to changing operating conditions of the motor as provided by one or more various inputs including demand 24, or feedback in the form of machine speed 44 or torque delivered 42.

A typical phasing sequence for a 4-phase SRM is illustrated in FIG. 4A through 4D, showing all of phases A-D being activated in sequential order and corresponding rotor 70 position and winding energizing/activation (shown in black fill) of the SRM 40a of FIG. 2. With respect to the sequential order of phases A-D, it is appreciated that portions of phases may overlap, i.e., current delivery or excitation of a subsequent phase may start before such excitation/current delivery is completed in the preceding phase. Furthermore, timing between two sequential phases may be consecutive (i.e., phase b immediately following in immediate succession after completion of phase A) or timed such that the subsequent phase follows in succession after a delay from the completion of the preceding phase.

Figures 4A, 4B, 4C, 4D:
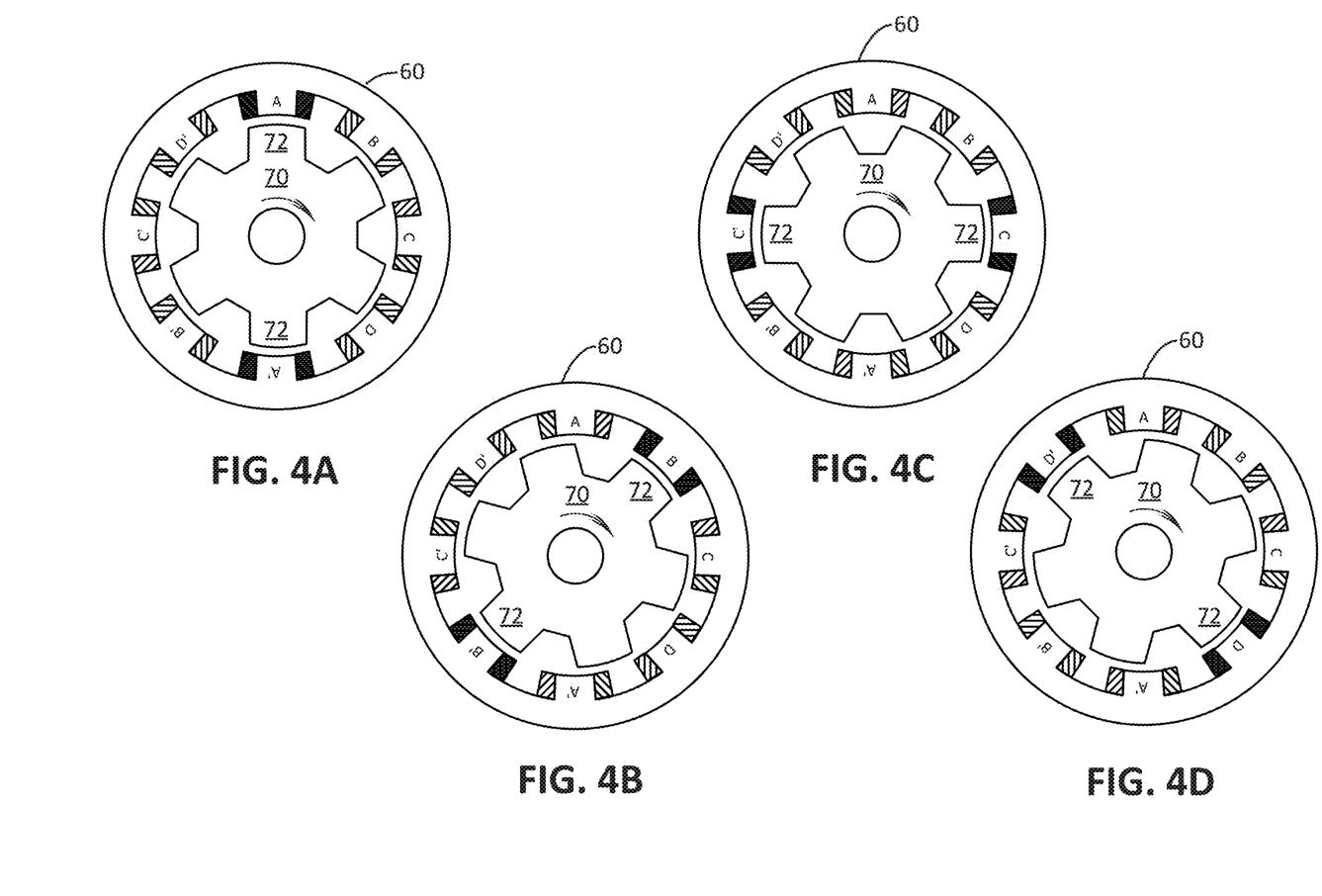
FIG. 4A through 4D are schematic diagrams illustrating a typical phasing sequence for a 4-phase SRM, showing all of phases A-D being activated in sequential order and corresponding rotor 70 position and winding energizing/activation (shown in black fill)
Figures 5A, 5B, 5C, 5D:
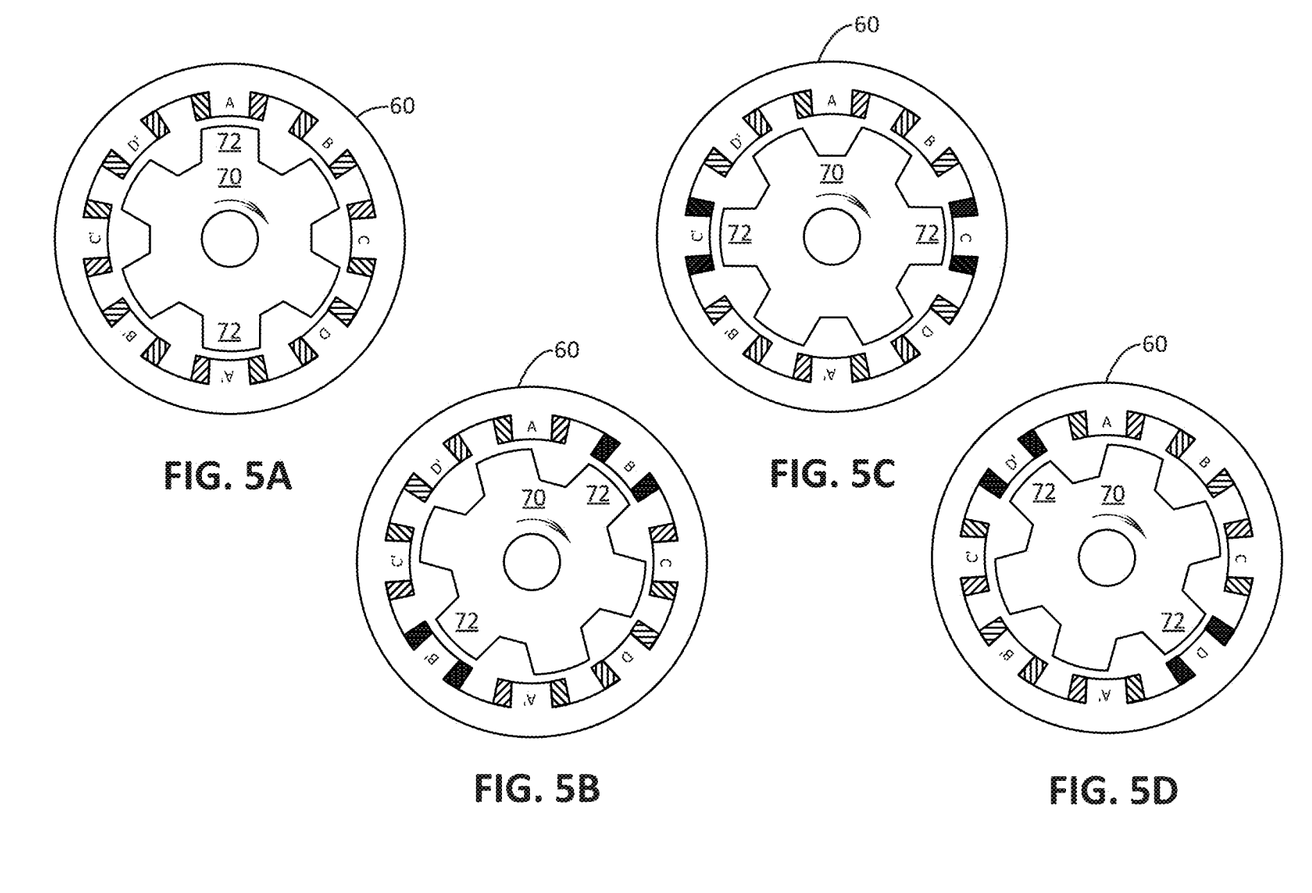
FIG. 5A through 5D illustrate an embodiment of a phasing sequence wherein a phase, or a portion thereof, among one or more of phases A-D is skipped.

In FIG. 4A, the phase A windings are energized, aligning the rotor teeth 72 with the stator poles A and A', while the rotor teeth 72 are semi-aligned with stator poles B and B' and stator poles D and D' and unaligned with stator poles C and C'. In FIG. 4B, the phase B windings are energized, aligning the rotor teeth 72 with the stator poles B and B', while the rotor teeth 72 are semi-aligned with stator poles A and A' and stator poles C and C' and unaligned with stator poles D and D'. In FIG. 4C, the phase C windings are energized, aligning the rotor teeth 72 with the stator poles C and C', while the rotor teeth 72 are semi-aligned with stator poles B and B' and stator poles D and D' and unaligned with stator poles A and A'. In FIG. 4D, the phase D windings are energized, aligning the rotor teeth 72 with the stator poles D and D', while the rotor teeth 72 are semi-aligned with stator poles A and A' and stator poles C and C' and unaligned with stator poles B and B'.

Figure 6A:
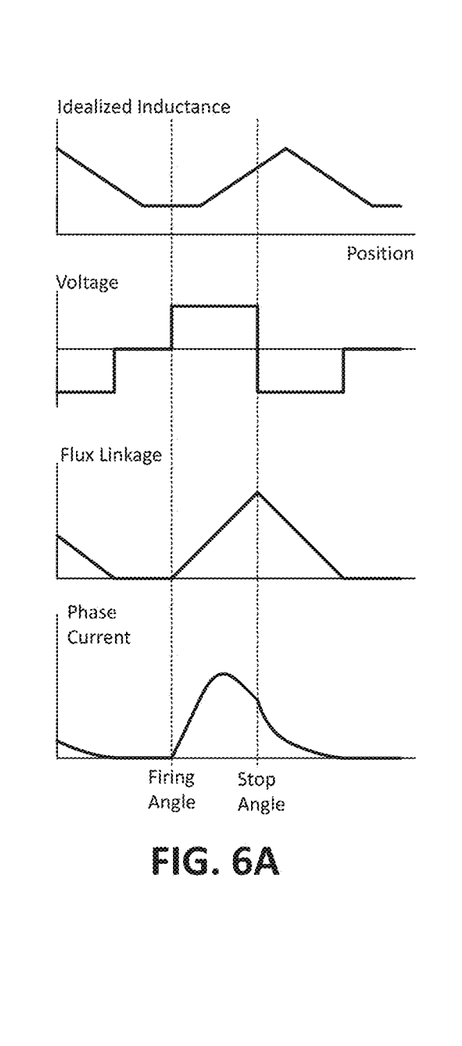
FIG. 6A illustrates an embodiment of waveform profiles for operating a single phase of an SRM motor for idealized inductance, voltage, flux linkage and phase current with respect to motor (angular) position. The angular position of exemplary commutation angles (i.e., turn-on (firing) angle and turn-off (stop) angle) are shown with dashed lines across the various waveforms.
Figure 6B:
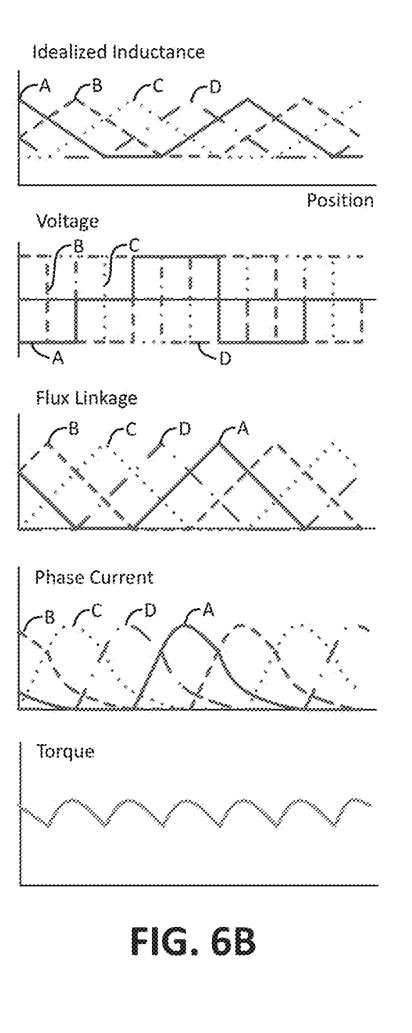
FIG. 6B illustrates the waveform profiles of FIG. 6A applied to a 4-phase motor operating under the phasing sequence illustrated in FIG. 4A through 4D, with phase A being shown as a solid line and phases B through D as differing dashed lines. A plot of the output torque as a function of motor position, aligned with the waveforms for idealized inductance, voltage, flux linkage and phase current, is also provided.

FIG. 6A illustrates an embodiment of waveform profiles for operating a single phase of an SRM motor for idealized inductance, voltage, flux linkage and phase current with respect to motor (angular) position. The angular position of exemplary commutation angles (i.e., turn-on (firing) angle and turn-off (stop) angle) are shown with dashed lines across the various waveforms. FIG. 6B illustrates the waveform profiles of FIG. 6A applied to a 4-phase motor operating under the phasing sequence illustrated in FIG. 4A through 4D, with phase A being shown as a solid line and phases B through D as differing dashed lines. A plot of the output torque as a function of motor position, aligned with the waveforms for idealized inductance, voltage, flux linkage and phase current, is also provided at the bottom of the figure.

As explained above, controller 20 and application programming 22 are configured in an embodiment to provide command signals involving one or more skipped phase or phase portions in response to changing operating conditions of the motor. FIG. 5A through 5D illustrate an embodiment of a phasing sequence wherein a phase, or a portion thereof, among one or more of phases A-D are skipped in accordance with an aspect of the present disclosure. A "skipped" phase or phase portion is herein defined to mean providing a signal (e.g. to the converter 30 and/or winding 46a-46n) that does not activate, energize, excite or otherwise deliver current to the winding 46a-46n corresponding to the phase to be "skipped," or provides a partial or lower-level of activating, energizing, or current delivery to the winding 46a-46n corresponding to the phase to be "skipped." In one embodiment, skipping a phase or phase portion may be achieved by sending a signal to or otherwise operating the converter (e.g. converter 30a) to skip all three states or modes of the phase. Alternatively, skipping a phase or phase portion may comprise or skip one or more states of a phase (e.g. skip one or more excitation (charging) and/or demagnetization (discharging) states, while still allowing the phase to operate in the free-wheeling (idle) state). With respect to a partial or lower-level of activating, energizing, or current delivery to a skipped phase or phase portion, one or more of a decreased phase current level (e.g. magnitude/amplitude), total conduction period, activation window (e.g. time between the turn-on or firing angle and turn-off or stop angle), or other parameter may be adjusted such that the skipped phase or phase portion has a lower, or significantly lower torque output as compared to the other (non-skipped) phases.

Figure 6C:
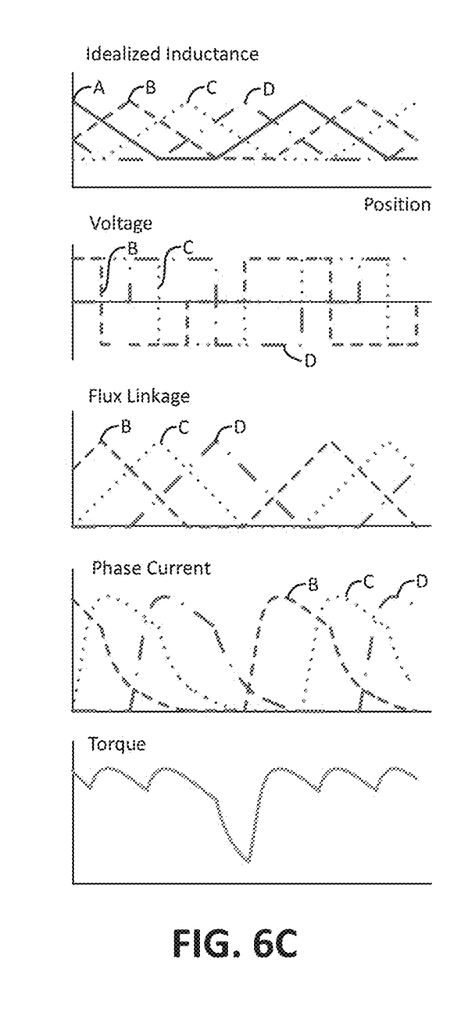
FIG. 6C illustrates the waveform profiles of FIG. 6A applied to a 4-phase motor operating under the phasing sequence illustrated in FIG. 5A through 5D, with phase A being skipped.

In the phasing sequence embodiment shown in FIG. 5A through 5D, phase A (FIG. 5A) is skipped (i.e., is deactivated, de-energized, demagnetized, etc.) either in part or in whole with respect to timing, magnitude, etc., while phases B through D (FIG. 5A through 5D) continue in their normal sequence. FIG. 6C illustrates the waveform profiles of FIG. 6A applied to a 4-phase motor operating under the phasing sequence illustrated in FIG. 5A through 5D, with phase A being skipped. As shown in FIG. 6C, while the solid line of phase A still remains for the idealized inductance, it is zero for the voltage, flux linkage and phase current. It is appreciated that the waveform of the skipped phase A may also comprise a non-zero value that is some fraction of the magnitude, amplitude, or activation window (stop angle—firing angle) compared to the waveforms of phases B, C and D.

As shown in FIG. 6C, the output torque is much smaller at the angular position corresponding to the skipped phase excitation than the positions corresponding to phases B, C and D. Furthermore, the controller 20 and application programming 22 may be configured to increase one or more of the level (e.g. magnitude/amplitude) and timing (e.g. via expanding the commutation angles) of the current delivered to the non-skipped or un-skipped phases than for the phasing sequence condition of no skipped phases (e.g. as provided in FIG. 4A through FIG. 4B). This is reflected in the waveforms of phases B, C and D shown in FIG. 6C, which have larger magnitude/amplitude and commutation windows than the waveforms of phases A-D shown in FIG. 6B. This has the effect of increasing the torque during the angular positions corresponding to the phase excitation of phases B, C and D compared to that in the non-skipped sequence of FIG. 4A through FIG. 4B. In doing so, the average or total torque output may be manipulated to match a specified demand on the motor.

The phasing sequence embodiment shown in FIG. 5A through 5D shows one phase (phase A) out of the four motor phases skipped, for a skip fraction of ¼ (and corresponding firing fraction of ¾). However, it is appreciated that any number or sequence of phases may be skipped in accordance with a requested output or demand 24. For example, in another embodiment or in response to a different requested output or demand 24, phases B and D may be skipped to generate a skip fraction of ½. Correspondingly, in relation to other cycles of phases (wherein in this 4-phase motor phases A through D correspond to one full cycle), subsequent or preceding cycles may have differing phases skipped, so as to inhibit or reduce possible noise, vibration, or harshness (NVH) from the varying output torque. One or more phase cycles may not have a skipped cycle to further increase the denominator of the skip fraction. For example, if only one phase is skipped every two phase cycles, the corresponding skip fraction is ⅛ for a 4-phase motor.

Selective Phase Control System for SRM

Figure 7:
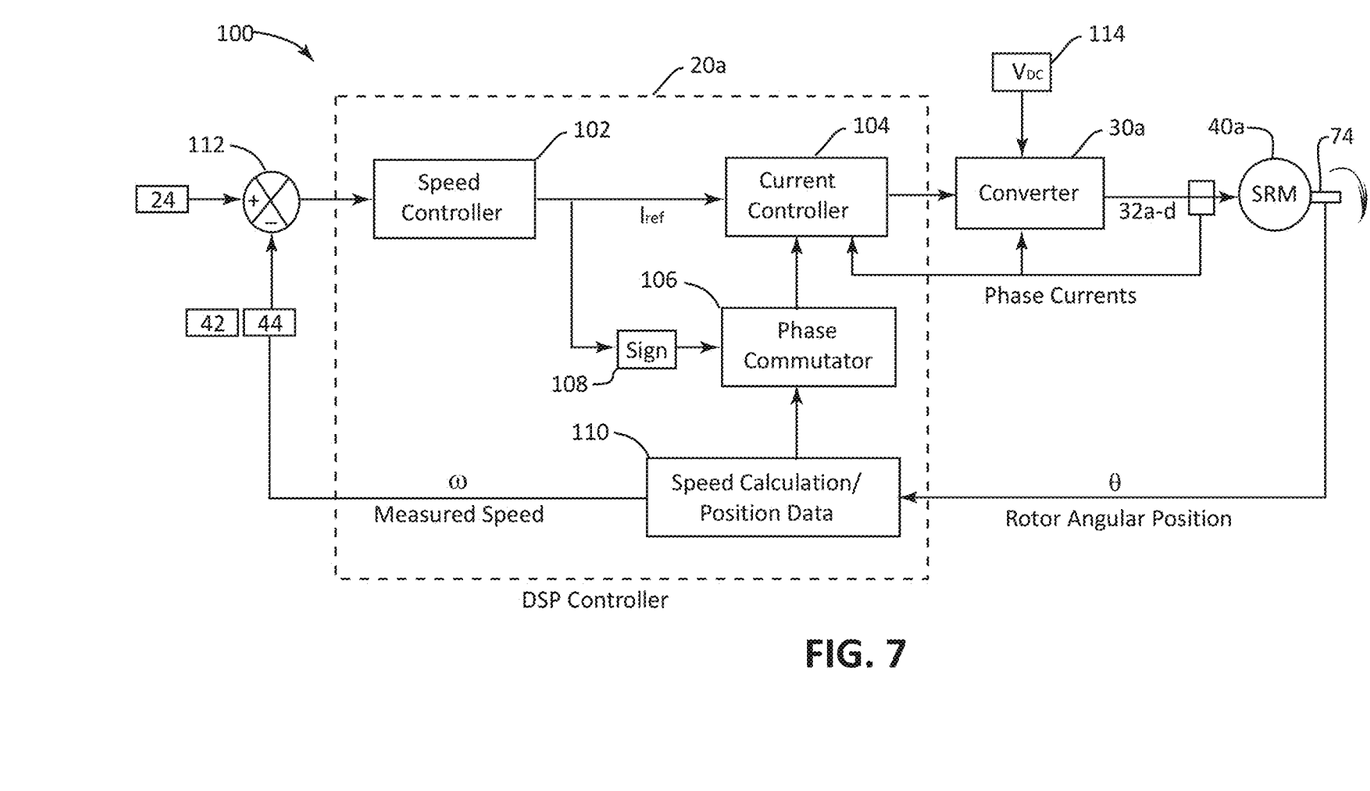
FIG. 7 illustrates a schematic diagram of an embodiment of a closed-loop speed and current control system for operating an SRM.

FIG. 7 illustrates a schematic diagram of an embodiment of a closed-loop speed and current control system 100 for operating an SRM 40a. System 100 comprises an outer speed control loop and an inner current loop that creates desired currents in the stator of SRM 40a. In the outer control loop, speed position data is input to a speed controller 102 for generating the desired phase current command/demand $I_{ref}$. In one embodiment, the desired current $I_{ref}$ is not fixed, but changes based on the error (calculated via comparator 112) between an input demand 24 (e.g. requested speed, torque) and measured or output speed 44 of the SRM 40a. In some embodiments, desired current $I_{ref}$ may also be a function of a torque demand provided at input demand 24 and a measured or output torque 42 from the SRM 40a. A speed calculation module may be used to acquire the machine speed ω from the rotor angular position θ, e.g. by use of a sensor such as an opto-coupler or the like at the rotor shaft 74 or other location on the SRM 40a.

Speed controller 102 may comprise any number of controller types available in the art, such as proportional integral derivative (PID) controller, two degree of freedom controller, fuzzy controller, adaptive controller, artificial neural network controller, or the like.

The output of the speed controller 102 is received by a current controller 104, which may comprise a hysteresis controller or like device. The embodiment shown in FIG. 7 comprises a hybrid structure comprising a speed controller 102 and current controller 104, however it is appreciated that in other embodiments, system 100 may comprise only one of the speed controller and current controller or an integrated version thereof.

In one embodiment, the current controller 104 is configured for providing switching/gating signals to the converter 30a as a function of phase current and the desired current (current command) $I_{ref}$. In one embodiment, the difference between the present phase current to the current reference is calculated to check its status with respect to the hysteresis band limits. The current controller 104 may comprise a hysteresis current control algorithm for motoring and generating operations of the SRM 40a. For example, a control algorithm for determining the motoring/generating switching statuses may include: a first status to turn ON two switches, a second status to turn ON one switch and turn OFF the other switch, and a third status to turn OFF both the switches of the various phases of the converter 30a.

The current controller 104 may also include an algorithm for determining skipping of one or more phases according to desired current Ira. In particular, the current controller 104 may determine a skip fraction (and/or corresponding firing fraction) based on the desired current $I_{ref}$, and also provide instructions for which phases are to be skipped in the present and subsequent phase cycles according to the skip/firing fraction (e.g. via implementation of a sigma-delta controller or like controller as provided in more detail below). In one embodiment, the current controller 104 is configured to adjust the current command or desired current $I_{ref}$ that controls an average of the measured or output torque 42 of the SRM 40a to match an input demand 24, or otherwise be at a level that corresponds to the best efficiency of the SRM 40a at a given motor speed.

In order to achieve precise control of phase current at various machine operating speeds, the current controller 104 may receive input from a phase commutator 106 such that each active phase is operated between the optimum turn-on and turn-off angle positions. When the phase operation starts, the winding is excited until the current command is reached and then demagnetized when the phase operation is turned off. The phase commutator 106 may receive rotor position and/or speed input from the speed calculation 110 and speed controller (sign 108) in determining commutation angles for various phase cycles under various SRM 40a operating conditions, and determine one or more of commutation angles (turn-on (firing) angle, turn-off (stop) angle, total conduction period and the magnitude of the phase current. In an embodiment, the phase commutator 106 may be configured to convert torque commands and/or speed commands into a set of phase current commands, as a function of various parameters such as average torque, torque ripple, NVH and other performance parameters.

In the embodiment illustrated in FIG. 7, the current controller 104 and phase commutator 106 are shown as components that are separate from the speed controller 102 to facilitate explanation of its function. However, in various embodiments, the current controller 104 and phase commutator 106 may be implemented along with speed controller 102 and other logic devices as an integrated processor such as a digital signal processor (DSP) controller 20a, as separate components, or as part of power controller/converter 30/30a or in other appropriate forms. Furthermore, algorithms used for operation of one or more of the speed controller 102, current controller 104, phase commutator 106 may be implemented as one or more subroutines in application programming 22, or as separate applications operable on differing processors.

In another embodiment, DSP controller 20a may be configured to provide pulsed control according to the system and method described in U.S. application Ser. No. 16/353,166, filed on Mar. 14, 2019 (U.S. Pat. No. 10,742,155) incorporated herein by reference in its entirety, such that the output of the SRM 40a is intelligently and intermittently modulated between "torque on" and "zero (no) torque" states in a manner that: (1) meet operational demands, while (2) improving overall efficiency. In one such embodiment, one or more of the speed controller 102 and current controller 104 are used to determine a desired output level and the desired duty cycle for pulsed operation at a specified current motor speed (which is preferably at or close to the system's maximum efficiency energy conversion output level at the current motor speed—although other energy efficient levels can be used as appropriate). The speed controller 102 and current controller 104 may then direct the converter 30a to implement the desired duty cycle at a designated power level. Conceptually, this may be accomplished by effectively turning the power supply 114 on and off at a relatively high frequency such that the fraction of the time that power is supplied to the motor corresponds to the desired duty cycle, and the power level corresponds to the preferred output level. In some embodiments, the "off" portion of the duty cycle may be implemented by directing the converter 30a to drive the motor to deliver zero torque.

Figure 8A:
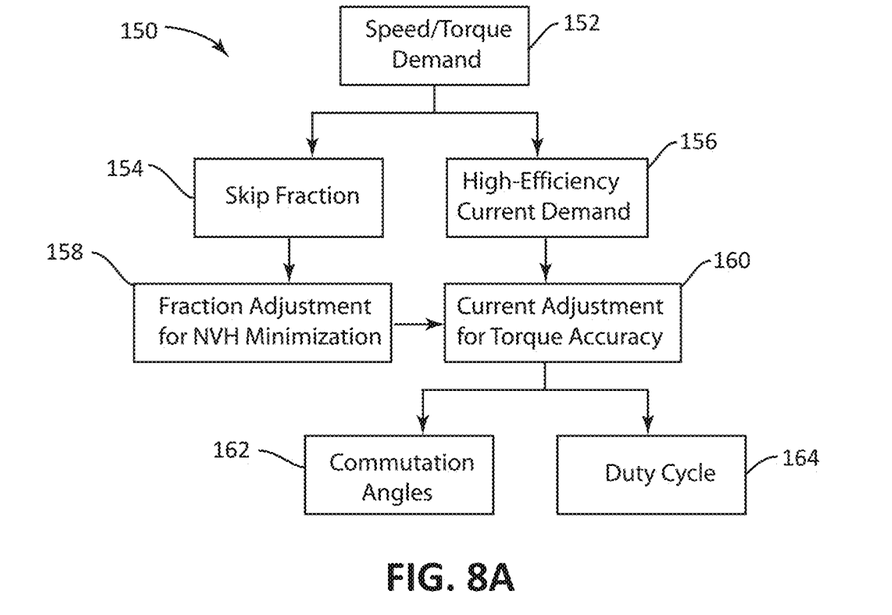
FIG. 8A shows a flow diagram of a first control process for operating an electric machine.
Figure 8B:
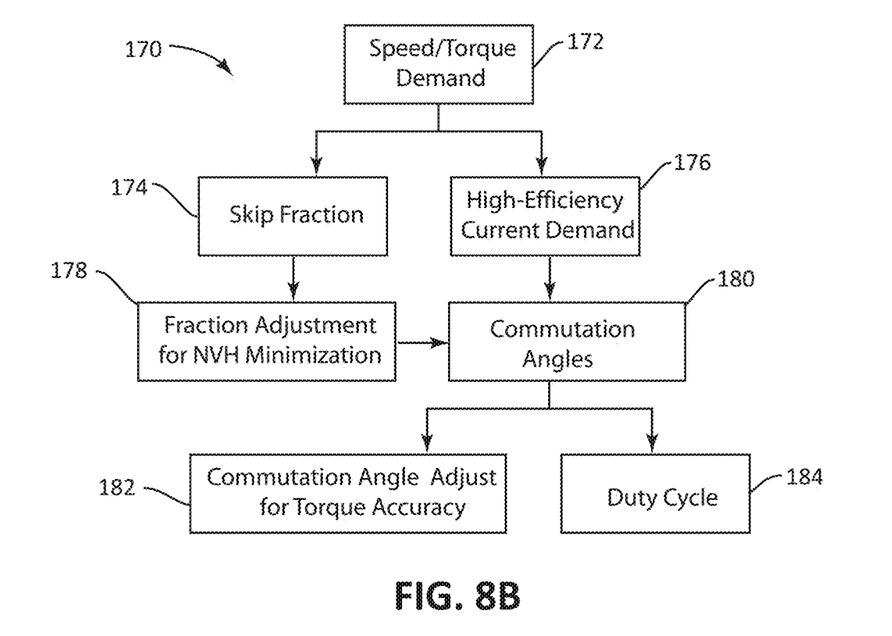
FIG. 8B shows a flow diagram of a second control process for operating an electric machine.
Figure 8C:
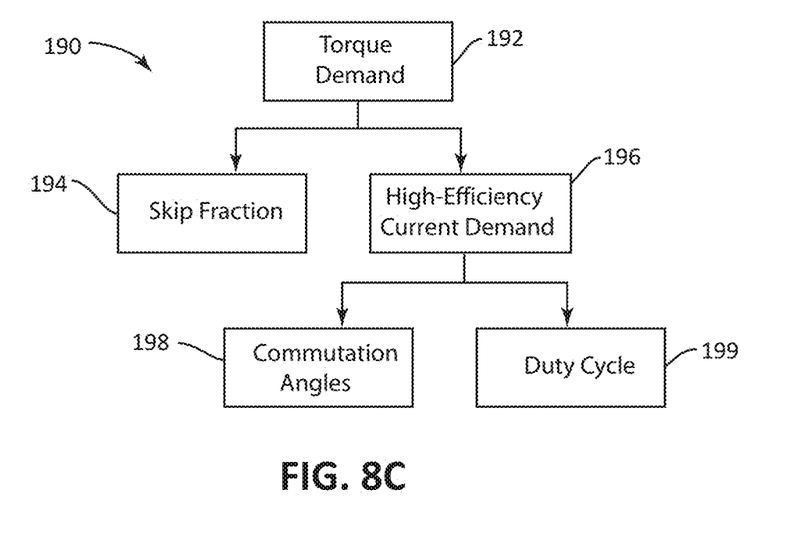
FIG. 8C shows a flow diagram of a third control process for operating an electric machine.

Referring now to FIG. 8A through FIG. 8C, controller 20, DSP controller 20a, or one or more of the speed controller 102, current controller 104, phase commutator 106, collectively or individually may be configured to operate in a number of differing control process configurations for operation of the electric machine 40 or SRM 40a shown in FIG. 1 and FIG. 7, respectively. Each of the process steps detailed in the flow diagrams of FIG. 8A through FIG. 8C may be provided as an individual controller, module, subroutine, or other programming.

FIG. 8A shows a flow diagram of a first control process 150 for operating electric machine 40 or SRM 40a. At block 152, speed and/or torque demand data is received for determination of the current demand (i.e., $I_{ref}$) at block 156 and skip fraction at 154. The skip fraction is the ratio of the number of skipped phases to phase activation/excitation opportunities (i.e., skipped phases plus fired (activated/excited) phases). It is appreciated that block 152 may also or alternatively be calculated in terms of firing fraction e.g. to the portions over the ratio of the number fired (activated/excited) phases to phase activation/excitation opportunities.

In one embodiment, the skip fraction calculation block/module 152 may be configured to determine an effective skip or firing fraction that is suitable for delivering the desired torque. In some embodiments, the skip fraction is selected from a set of predetermined skip fractions that are determined to be fuel efficient and/or have acceptable NVH characteristics given the machine. The skip fraction may be generated or selected using any suitable mechanism e.g. selected from a library of predefined effective firing fractions and/or from one or more lookup tables. Various implementations involve using a lookup table to determine an effective firing fraction based on one or more machine parameters (e.g. torque, machine speed, etc.), fuel consumption, and/or NVH associated with various effective firing fractions.

In one embodiment, the skip fraction is selected or otherwise calculated as a function of the input demand 24 (e.g. torque demand) and a desired torque that corresponds to an optimal torque efficiency at a given machine speed ω. In other embodiments, the skip fraction is selected such that an average of the output torque 42 matches the input demand 24. In further embodiments, the skip fraction is selected to have a denominator that optimizes for NVH.

At block 158, the skip fraction may further be adjusted for NVH minimization. At block 160, the adjusted skip fraction from block 158 may then be used to adjust the current demand from block 156 for torque accuracy at block 160. Commutation angles (i.e., firing angle, stop angle) and duty cycle may then be computed at block 162 and block 164, respectively.

FIG. 8B shows a flow diagram of a second control process 170 for operating electric machine 40 or SRM 40a. At block 172, speed and/or torque demand data is received for determination of the current demand (i.e., $I_{ref}$) at block 176 and skip fraction at 174. At block 178, the skip fraction may further be adjusted for NVH minimization. At block 180, commutation angles (i.e., firing angle, stop angle) are computed using the adjusted skip fraction from block 178 and the current demand from block 176 for torque accuracy at block 160. Commutation angles (i.e., firing angle, stop angle) may be further adjusted for torque accuracy at block 182, and the duty cycle may then be computed at block 184.

FIG. 8C shows a flow diagram of a third control process 190 for operating electric machine 40 or SRM 40a. At block 192, speed and/or torque demand data is received for determination of the current demand (i.e., $I_{ref}$) at block 196 and skip fraction at 194. The current demand (i.e., $I_{ref}$) from block 196, the commutation angles (i.e., firing angle, stop angle) are computed at block 198 and the duty cycle is computed at block 199.

Once the skip fraction or firing fraction is calculated, a skip (or firing) timing determination is made. It is noted that in some circumstances, repeating a skipped phase may result in undesirable noise, harshness, and vibration (NVH). Thus, the timing/distribution of which phases get skipped or fired may be distributed among the phases according to a timing sequence to minimize NVH and/or otherwise optimize machine performance. In certain embodiments, this may be part of or have application to the adjustment for NVH minimization (e.g. block 158 of FIG. 8A and block 178 of FIG. 8B). Based on the received skip or firing fraction, the skip (or firing) timing determination may include sequence of skip (or firing) commands, a phase timing sequence, that cause the machine to deliver the percentage of firings and firing output torque levels necessary to generate the desired machine output, wherein the sequence includes a mix of firing/skipping opportunity outcomes over a selected interval. The phase timing sequence may comprise a selection of which phases are skipped from the plurality of sequential phases. This sequence, which may also be referred to as a "drive pulse," may be generated in variety of ways, such as using a separate module such as a sigma-delta converter, or through the use of one or more look up tables or using a state machine.

One class of controllers that is particularly well suited for use as a drive pulse generator is adaptive predictive controllers. As will be appreciated by those familiar with control theory, adaptive predictive controllers are adaptive in that they utilize feedback to adapt or change the nature of their output signal based on the variance of the output signal from a desired output signal and predictive in that they are integrative so that past behavior of the input signal affects future output signals.

Sigma-Delta Control

A variety of different adaptive predictive controllers may be used to calculate the drive pulse required to provide the desired output and/or for skip (or firing) timing determination, and in particular to mitigate issues such as NVH. One class of adaptive predictive controllers that work particularly well in this application is sigma-delta controllers. The sigma-delta controller may utilize sample data sigma-delta, continuous time sigma-delta, algorithm based sigma-delta, differential sigma-delta, hybrid analog/digital sigma-delta arrangements, or any other suitable sigma-delta implementation. Exemplary sigma-delta decision modules are described in the U.S. application Ser. Nos. 16/353,159 and 16/353,166, both filed Mar. 14, 2019, and both incorporated herein for all purposes.

In one embodiment, a sigma-delta converter or module is incorporated into the controller 20, DSP controller 20a, e.g. as a separable controller or as being integrated in current controller 104 or other module or controller. As will be appreciated by those familiar with sigma-delta control, a characteristic of sigma-delta control is that it facilitates noise shaping and tends to reduce/eliminate idle tones and push noise to higher frequencies. When noise is randomized and/or spread to frequencies that are above the limits of human perception, it is less of a concern since any such noise and/or vibration is not bothersome to the users of the machine.

A wide variety of different sigma-delta converters may be used as the sigma-delta converter and the sigma-delta converter may utilize a variety of different feedback schemes. By way of example, a first order sigma-delta converter is inherently stable as a controller. Although a first order sigma-delta converter works well, it should be appreciated that in other embodiments, higher order sigma-delta converters may be used (e.g. sigma-delta converters that utilize a higher number of integrators than a first order sigma-delta converter). For example, third-order sigma-delta converters (as for example converters using the Richie architecture) use three comparators.

Generally, the sigma-delta converters may be implemented algorithmically, digitally, using analog components and/or using hybrid approaches. For example, in various embodiments, the sigma-delta converter may be implemented on a processor, on programmable logic such as an FPGA, in circuitry such as an ASIC, on a digital signal processor (DSP), using analog, digital and/or hybrid components, or any/or using other suitable combinations of hardware and/or software. In various embodiments, the sigma-delta controller may utilize sample data sigma-delta, continuous time sigma-delta, differential sigma-delta, or any other suitable sigma-delta implementation scheme.

U.S. Pat. No. 8,099,224 and U.S. Patent Publication No. 2018-0216551, which are incorporated herein by reference in their entirety, describe a number of representative sigma-delta converter designs. Although the applications described therein are for controlling different types of machines or motors, similar types of converters may be used for the present application.

Additional Embodiments

In the context of SRMs, the selective phase control systems and methods of the present description may be used in a variety of industries: automotive robotics, aviation, industrial applications, automation, washing machines, vacuum cleaners, fans, oil pumps, etc.

While the above described selective phase control systems and methods are particularly useful for SRMs, it should be appreciated that the above described selective phase control systems and methods may be equally beneficial for a variety of electric machines, for use in numerous vehicle and propulsion related applications, including: electric motors used in other types of vehicles, including trucks, cars, carts, motorcycles, bicycles, drones and other flying devices; in robots and other devices that move autonomously within an environment; etc. As such, the term "vehicle" should be broadly construed to include all of the above and any other type of motorized moving assembly whether known now or developed in the future.

Motors used in appliances such as washing machines, dryers, heating, ventilation, and air conditioning (HVAC) applications may provide additional examples of applications that can benefit from selective-phase control. Although only a few embodiments of the present technology have been described in detail, it should be appreciated that the present technology may be implemented in many other forms without departing from the spirit or scope of the present technology. The various described selective phase controllers and associated machine elements may be implemented, grouped, and configured in a wide variety of different architectures in different embodiments. For example, in some embodiments, the controller may be incorporated into a motor controller or an inverter controller or it may be provided as a separate component. Similarly, for a generator, the controller may be incorporated into a generator controller or a rectifier controller and in combined motor/generators the controller may be incorporated into a combined motor/generator controller or a combined inverter/rectifier controller. In some embodiments, the described control functionality may be implemented algorithmically in software or firmware executed on a processor—which may take any suitable form, including, for example, general purpose processors and microprocessors, DSPs, etc.

The machine controller may be part of a larger control system. For example, in vehicular applications, the described control may be part of a vehicle controller, a powertrain controller, a hybrid powertrain controller, or an ECU (engine control unit), etc. that performs a variety of functions related to vehicle control. In such applications, the vehicle or other relevant controller, etc. may take the form of a single processor that executes all of the required control, or it may include multiple processors that are co-located as part of a powertrain or vehicle control module or that are distributed at various locations within the vehicle. The specific functionalities performed by any one of the processors or control units may be widely varied.

Generally, the schemes for selective phase motor control may be implemented digitally, algorithmically, using analog components, or using hybrid approaches. The machine controller may be implemented as code executing on a processor, on programmable logic such as an FPGA (field programmable gate array), in circuitry such as an ASIC (application specific integrated circuit), on a digital signal processor (DSP), using analog components, or any other suitable piece of hardware. In some implementations, the described control schemes may be incorporated into object code to be executed on a digital signal processor (DSP) incorporated into an inverter controller (and/or rectifier controller in the context of a generator and/or a combined inverter/rectifier controller).

Therefore, the present embodiments should be considered illustrative and not restrictive, and the present technology is not to be limited to the details given herein but may be modified within the scope and equivalents of the appended claims.

What is claimed is:

1. An electric machine, comprising:
   a stator having a multiplicity of spaced-apart individual stator windings; and
   a rotor in proximity to the stator, the rotor being rotationally responsive to current delivered to the individual stator windings;
   a controller, the controller being electrically coupled to the stator so as to independently provide delivery of current to the individual stator windings, the controller configured to:
   deliver current to the individual stator windings in a plurality of sequential phases to drive motion of the rotor; and
   selectively skip one or more of the plurality of sequential phases or a portion of one or more of the plurality of sequential phases in response to an input demand to the electric machine.

2. The electric machine as recited in claim 1, wherein each phase of the plurality of sequential phases corresponds to a delivery of current to one or more respective stator windings; and
   wherein selectively skipping one or more of the plurality of sequential phases comprises restricting or limiting delivery of current the one or more respective stator windings corresponding to a skipped phase.

3. The electric machine as recited in claim 1, wherein the controller is further configured to modify one or more of a magnitude and timing of one or more of the plurality of sequential phases that are not selected to be skipped.

4. The electric machine as recited in claim 3, wherein the one or more of the magnitude and timing are selected to modify an output of the electric machine to correspond to the input demand.

5. The electric machine as recited in claim 4, wherein modifying the timing of a non-skipped phase comprises modifying one or more commutation angles of the non-skipped phase.

6. The electric machine as recited in claim 1, wherein the controller is further configured to determine a skip fraction corresponding to the input demand, the skip fraction corresponding to a ratio of the number of skipped phases to phase activation opportunities.

7. The electric machine as recited in claim 6, wherein the skip fraction is calculated as a function of the input demand and a given machine speed.

8. The electric machine as recited in claim 6, wherein the controller is further configured to select a phase timing sequence as a function of the skip fraction, the phase timing sequence comprising selection of which phases are skipped from the plurality of sequential phases.

9. The electric machine as recited in claim 8, wherein the controller comprises a sigma-delta controller configured to calculate the phase timing sequence.

10. The electric machine as recited in claim 1, wherein the electric machine comprises a switch reluctance motor.

11. A method of controlling operation of an electric machine, the method comprising:
    providing a rotor in proximity to a stator, the stator comprising a multiplicity of spaced-apart individual stator windings and the rotor being rotationally responsive to current delivered to the individual stator windings;
    delivering current to the individual stator windings in a plurality of sequential phases to drive motion of the rotor; and
    selectively skipping one or more of the plurality of sequential phases or a portion of one or more of the plurality of sequential phases in response to an input demand to the electric machine.

12. The method as recited in claim 11, wherein each phase of the plurality of sequential phases corresponds to a delivery of current to one or more respective stator windings; and
    wherein selectively skipping one or more of the plurality of sequential phases comprises restricting or limiting delivery of current the one or more respective stator windings corresponding to a skipped phase.

13. The method as recited in claim 11, further comprising:
    modifying one or more of a magnitude and timing of one or more of the plurality of sequential phases that are not selected to be skipped.

14. The method as recited in claim 13, wherein the one or more of the magnitude and timing are selected to modify an output of the electric machine to correspond to the input demand.

15. The method as recited in claim 14, wherein modifying the timing of a non-skipped phase comprises modifying one or more commutation angles of the non-skipped phase.

16. The method as recited in claim 11, further comprising:
determining a skip fraction corresponding to the input demand, the skip fraction corresponding to a ratio of the number of skipped phases to phase activation opportunities.

17. The method as recited in claim 16, wherein the skip fraction is calculated as a function of the input demand and a given machine speed.

18. The method as recited in claim 16, further comprising:
calculating a phase timing sequence as a function of the skip fraction, the phase timing sequence comprising selection of which phases are skipped from the plurality of sequential phases.

19. The method as recited in claim 18, wherein a sigma-delta controller is used to calculate the phase timing sequence.

20. The method as recited in claim 11, wherein the electric machine comprises a switch reluctance motor.

\* \* \* \* \*